(12) United States Patent
McKelvy et al.

(10) Patent No.: US 6,378,821 B1
(45) Date of Patent: Apr. 30, 2002

(54) ELECTRICAL EQUIPMENT CLUSTER MOUNT

(75) Inventors: Marvin D. McKelvy; Melvin E. Clutter, both of Centralia, MO (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/511,152

(22) Filed: Feb. 23, 2000

(51) Int. Cl.[7] ............................................. A47B 96/06
(52) U.S. Cl. ................ 248/218.4; 248/219.4; 211/107
(58) Field of Search .................... 248/218.4, 220.21, 248/220.22, 219.4; 211/107.26

(56) References Cited

U.S. PATENT DOCUMENTS

| | | | |
|---|---|---|---|
| 2,708,087 A | 5/1955 | Blackstone | 248/221 |
| 2,879,964 A | 3/1959 | Anderson et al. | 248/221 |
| 2,990,151 A | 6/1961 | Phillips | 248/221 |
| 3,374,978 A | 3/1968 | Salmon et al. | 248/221 |
| 3,653,622 A | 4/1972 | Farmer | 248/221 |
| 3,734,438 A | 5/1973 | Kautz | 248/221 |
| 3,750,992 A | 8/1973 | Johnson | 248/221 |
| 3,856,250 A | 12/1974 | Farmer | 248/221 |
| 4,103,853 A | 8/1978 | Bannan | 248/219.1 |
| 4,296,904 A | 10/1981 | Farmer | 248/218.4 |
| 4,635,888 A | * 1/1987 | Aldridge et al. | 248/230.9 |
| 4,730,803 A | 3/1988 | Hillstrom | 248/297.2 |
| 4,781,348 A | 11/1988 | Cutforth et al. | 248/218.4 |
| 4,896,856 A | 1/1990 | Farmer et al. | 248/219.4 |
| 4,903,927 A | 2/1990 | Farmer | 248/219.4 |
| 5,193,774 A | * 3/1993 | Rogers | 248/219.4 |

* cited by examiner

*Primary Examiner*—Anita King
*Assistant Examiner*—Holly N. Sy
(74) *Attorney, Agent, or Firm*—Alfred N. Goodman; Garrett V. Davis

(57) ABSTRACT

A mounting rack is provided for supporting electrical equipment on a utility pole or other support. The mounting rack includes a mounting plate for attaching to the utility pole, a support member and at least one support bracket for coupling with the electrical equipment. The support member has at least one mounting arm coupled to the mounting plate to space the support member from the mounting plate. The mounting plate can have a mounting arm coupled to the support member. The mounting brackets are coupled to the mounting plate and to the support member by an intermediate bracket assembly. The intermediate bracket assembly has a pair of arms coupled to the mounting plate and the support member to space the respective mounting bracket from the mounting plate.

39 Claims, 9 Drawing Sheets

ELECTRICAL EQUIPMENT CLUSTER MOUNT

FIELD OF THE INVENTION

The present invention is directed to a device for mounting electrical equipment to a utility pole in a clustered array. More particularly, the invention is directed to a wing type mounting device for supporting electrical equipment on a support structure.

BACKGROUND OF THE INVENTION

Various electrical devices such as transformers are often mounted on utility poles using a suitable mounting bracket or other attaching device. It is common practice to mount electrical devices on a utility pole using a single mounting device capable of supporting several electrical devices.

One type of mounting device for supporting a plurality of electrical devices is disclosed in U.S. Pat. No. 3,374,978 to Selman et al. This device includes several mounting brackets spaced around the utility pole. The brackets are connected together by a linkage and clamped around the pole. The electrical devices are then attached to each of the brackets to encircle the utility pole.

Another type of electrical equipment mounting device includes a single bearing plate attached to a utility pole by bolts or other fasteners. A pair of elongated polygonal shaped structural members are attached to the bearing plate and extends in a generally horizontal direction. The structural members have elongated sides and open ends. Mounting brackets are attached at opposite ends of the structural member and along the length of the structural member. The electrical devices are then attached to the brackets to support the electrical devices around the utility pole. Examples of this type of device are disclosed in U.S. Pat. No. 4,296,904 to Farmer, U.S. Pat. No. 4,896,856 to Farmer et al., and U.S. Pat. No. 4,903,927 to Farmer et al.

A further example of the prior mounting devices include a bracket attached to a utility pole and a curved support bar attached to the bracket. The electrical devices are then attached to the curved bar at opposite ends thereof and along the length to position the electrical devices around the utility pole. Examples of this type of device are disclosed in U.S. Pat. Nos. 3,653,622 and 3,856,250 to Farmer.

Although these devices have been effective for supporting electrical equipment, there is a continuing need in the industry for improved electrical equipment mounting devices.

SUMMARY OF THE INVENTION

The present invention is directed to an electrical equipment mounting device for mounting electrical equipment on a utility pole. More specifically, the invention is directed to a wing-type mounting rack for mounting electrical equipment in a clustered array around a utility pole.

Accordingly, a primary object of the invention is to provide a mounting device for supporting a plurality of electrical devices on a utility pole that is economical to manufacture and easy to assemble.

Another object of the invention is to provide a mounting device for supporting a plurality of pieces of electrical equipment on a utility pole, wherein the electrical equipment can be attached to the mounting device while on the ground and then lifted and attached to the utility pole as a unit.

A further object of the invention is to provide a mounting device for electrical equipment having a mounting plate and a support member spaced from the mounting plate for supporting the electrical equipment.

Another object of the invention is to provide a mounting device for supporting electrical equipment in a clustered array around a utility pole where the mounting device has a plurality of brackets for supporting the electrical equipment.

Still another object of the invention is to provide a mounting device for electrical equipment where the mounting device includes a mounting plate, a support member coupled to the mounting plate and a plurality of electrical equipment supporting brackets coupled to the support member.

A further object of the invention is to provide a mounting device for electrical equipment where the mounting device includes a mounting plate and a support member having at least one mounting arm attached to the mounting plate for spacing the support member from the mounting plate.

Another object of the invention is to provide a mounting device for electrical equipment including a mounting plate having a pair of mounting arms and a support member having a pair of mounting arms where the mounting arms of the support member are coupled to the mounting arms of the mounting plate.

The objects of the invention are basically attained by providing a mounting device, for supporting electrical equipment on a utility pole, said device comprising a mounting plate, for coupling to a utility pole, said mounting plate having first and second sides, a support member having a body portion with first and second sides and at least one mounting arm extending from said body portion, said at least one mounting arm being coupled to said mounting plate, for spacing said body portion from said mounting plate, a first support bracket coupled to said first side of said mounting plate and said first side of said support member for supporting electrical equipment, and a second support bracket coupled to said second side of said mounting plate and said second side of said support member for supporting electrical equipment.

The objects of the invention are further attained by providing a mounting rack, for mounting electrical equipment on a utility pole, said mounting rack comprising a mounting plate for coupling to a utility pole, said mounting plate having first and second longitudinal side edges, a support member coupled to said mounting plate, said support member having a body portion extending in a first plane, first and second side edges, and first and second coupling arms extending outwardly from said body portion, first and second support brackets coupled to said side edges of said mounting plate and said side edges of said support member, and a third support bracket coupled to said outwardly extending coupling arms of said support member.

The objects of the invention are also attained by providing a mounting rack for mounting electrical equipment on a utility pole, said mounting rack comprising a mounting plate for coupling to a utility pole, said mounting plate having a top end, a bottom end, a first longitudinal side, and second longitudinal side, said mounting plate further having first and second mounting arms spaced from said longitudinal sides and extending outwardly from said mounting plate, at least one support member coupled to said mounting arms of said mounting plate, said support member having a body portion extending generally parallel to said mounting plate, and a plurality of support brackets coupled to said support member and said mounting plate for supporting electrical equipment.

The objects, advantages and salient features of the invention will become apparent from the following detailed description of the invention, taken in conjunction with the annexed drawings which form a part of this original disclosure.

BRIEF DESCRIPTION OF THE DRAWINGS

The following is a brief description of the drawings, in which.

DETAILED DESCRIPTION OF THE INVENTION

The present invention is directed to a mounting device for mounting a plurality of electrical devices on a utility pole or other support. More particularly, the invention is directed to a wing-type mounting rack for supporting electrical devices or other equipment in a clustered array on a utility pole.

Referring to FIGS. 1–5, the wing-type mounting rack 10 in a first embodiment of the invention includes a mounting plate 12, a support member 14, and support brackets 16.

Figure 1:
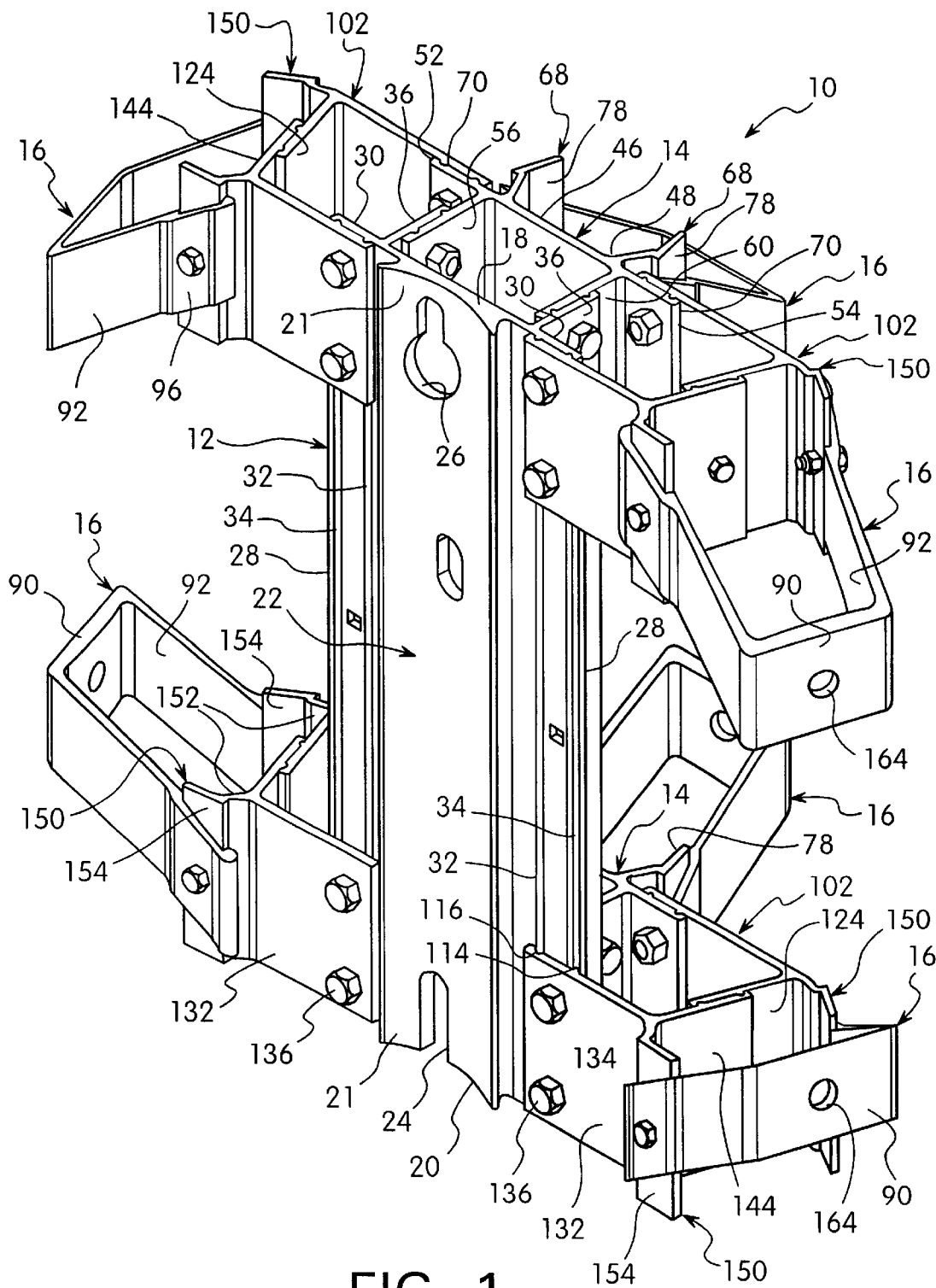
FIG. 1 is a perspective view of the electrical equipment mounting device in a first embodiment of the invention.

The mounting plate 12 of mounting rack 10 as shown in FIG. 1 has a generally elongated shape capable of supporting the weight of several electrical devices. Identical support members 14 are attached to the top and bottom ends of mounting plate 12 and a plurality of support brackets 16 are coupled to each support member 14 and mounting plate 12. Support brackets 16 are arranged in pairs with one positioned vertically above the other so that each pair of support brackets 16 is arranged for coupling to an electrical device.

The mounting plate 12 has a longitudinal dimension defining the length of the mounting rack 10 and includes a top end 18 and a bottom end 20. Mounting plate 12 also includes a center portion 21 having a concave face 22 for mounting against a utility pole or other support structure. Concave face 22 has a curvature to conform generally to the curvature of the utility pole. In further embodiments, mounting plate 12 can have a substantially flat face or other configuration complementing the mounting surface of the support structure. A substantially U-shaped notch 24 is formed along the bottom end 20 and an inverted key hole slot 26 is provided adjacent the top end 18 as shown in FIG. 1. Notch 24 and key hole 26 are dimensioned to receive a mounting bolt (not shown in FIG. 1) for attaching mounting plate 12 to a support structure. Mounting plate 12 further includes side edges 28 extending the longitudinal length of mounting plate 12 and spaced outwardly from concave face 22. In the embodiment illustrated, mounting rack 10 has a generally planar configuration with the concave face 22 positioned generally along the center axis.

Figure 3:
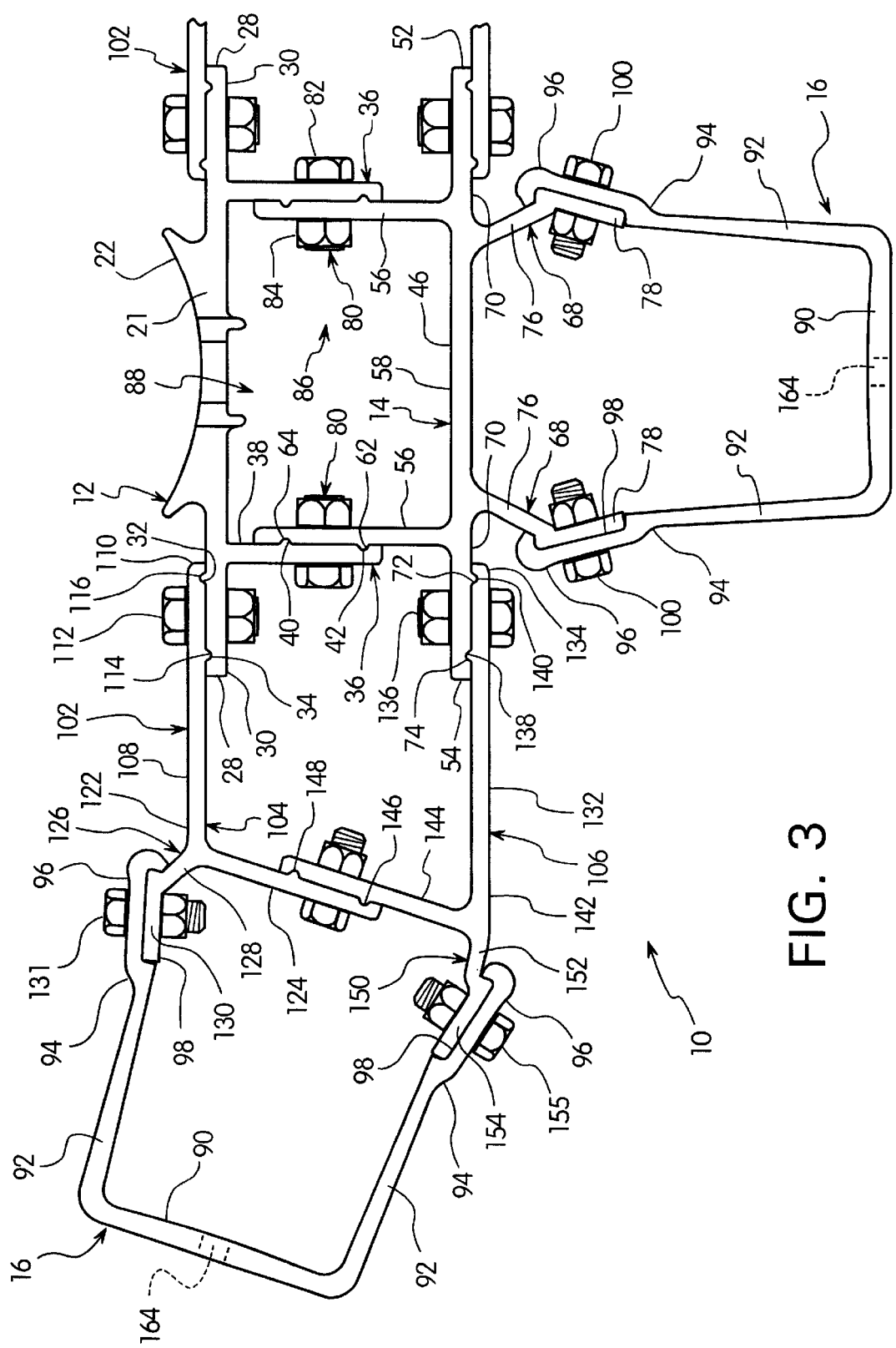
FIG. 3 is a partial top view of the electrical equipment mounting device of FIG. 1 showing the assembly of components in detail.

As shown in FIGS. 1 and 3, mounting plate 12 includes side coupling portions 30 extending between the center portion 21 and each side edge 28 defining a mounting surface for support brackets 16. Side coupling portions 30 include a rib 32 and a recess 34 extending the length of each side coupling portion 30 for interlocking with support bracket 16 as discussed hereinafter in greater detail.

As shown in FIG. 3, mounting plate 12 also includes a pair of mounting arms 36. In the embodiment illustrated, mounting arms 36 are integrally formed with mounting plate 12 and extend substantially perpendicular to side coupling portions 30 and are spaced inwardly from the side edges 28. In preferred embodiments, mounting arms 36 extend the length of mounting plate 12. Mounting arms 36 have a width sufficient to provide a coupling surface for coupling with support member 14 and to provide sufficient strength to mounting rack 10 to resist buckling under load. As shown in FIG. 3, mounting arms 36 include an inner surface 38 having a longitudinal ridge 40 and a recess 42 for interlocking with support member 14.

Figure 4:
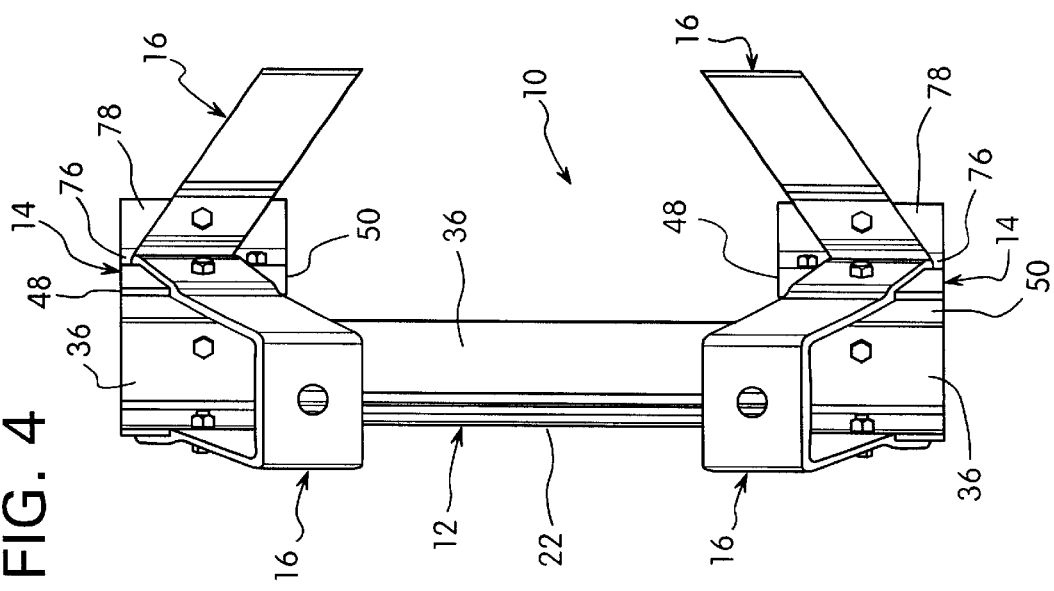
FIG. 4 is a side elevational view of the electrical equipment mounting device of the embodiment of FIG. 1.

Referring to FIG. 3, support member 14 includes a body portion 46. In the embodiment illustrated, body portion 46 has a generally planar configuration having a top end 48 and a bottom end 50 as shown in FIG. 4 and side edges 52 and 54 as shown in FIG. 3. A pair of mounting arms 56 extend from an inner face 58 of body portion 46 and are spaced inwardly from side edges 52 and 54. Mounting arms 56 extend in a longitudinal direction with respect to support member 14 and are the same length as body portion 46. In the embodiment illustrated, mounting arms 56 extend in a generally perpendicular direction to a plane of body portion 46. Each mounting arm 56 includes an outer face 60 having a longitudinal ridge 62 and recess 64 complementing ridge 40 and recess 42 of the arms 36 of mounting plate 12.

An outer face 66 of body portion 46 includes a pair of coupling arms 68 extending outwardly away from outer face 66. Body portion 46 also includes coupling portions 70 extending outwardly in the plane of body portion 46 to outer side edges 52 and 54. In the embodiment illustrated, coupling arms 68 extend in a generally opposite direction from mounting arms 56 and are spaced inwardly from side edges 52 and 54 of body portion 46. Coupling portions 70 include a longitudinal ridge 72 and a recess 74.

Coupling arms 68 include a first portion 76 extending at an incline with respect to body portion 46 in a generally outward direction toward side edges 52 and 54. A second portion 78 forming a coupling surface is integrally formed with first portion 76 and extends at an angle to the first portion 76 in a generally inward direction with respect to outer edges 52 and 54.

Figure 2:
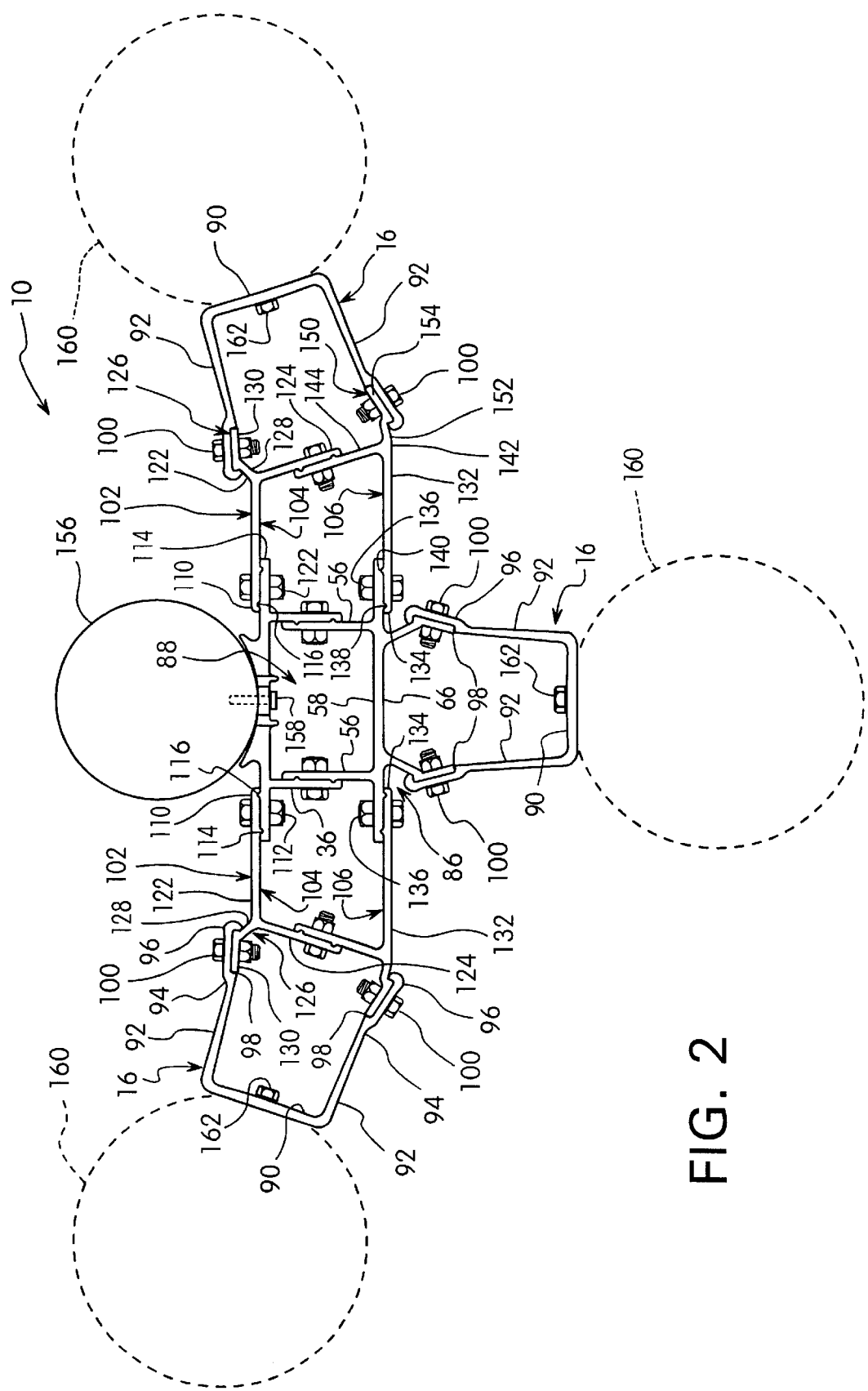
FIG. 2 is a top view of the electrical equipment mounting device of the embodiment of FIG. 1.

As shown in FIGS. 2 and 3, mounting plate 12 and support member 14 are coupled together by the mounting arms 36 and 56, respectively. The mounting arms 36 and 56 are assembled in an overlapping fashion with the complementing ridges and recesses interlocking the mounting arms together. Each of the mounting arms includes an aperture (not shown) for receiving a fastener 80 for coupling the mounting arms together. In the embodiment illustrated, fastener 80 is a threaded nut 82 and bolt 84. Mounting plate 12 and support member 14, when coupled together, form a structural assembly 86 having a generally rectangular hollow center 88. The coupling portions 30 of mounting plate 12 and coupling portions 70 on support member 14 are generally parallel to each other and extend outwardly on opposite sides of the structural member 86.

Referring to FIGS. 1–3, a plurality of support brackets 16 are coupled to mounting plate 12 and support member 14 in a spaced relation. In the embodiment illustrated, three support brackets 16 are provided at the top and bottom ends of mounting plate 12 and support member 14 for a total of six support brackets 16. Support brackets 16 have a generally U-shape with an outer wall 90 and a pair of legs 92 with inner ends 94. Inner ends 94 of legs 92 have an offset portion 96 defining a recess 98.

As shown in FIG. 3, one support 16 is coupled directly to support member 14 by coupling arms 68. Recess 98 in offset portion 96 of the bracket complements the outer surface of offset portion 78. Offset portion 96 and offset portion 78 include an aperture for receiving a fastener 100 for coupling bracket 16 to support member 14.

Referring to FIG. 3, a support bracket 16 is also coupled indirectly to each side of mounting plate 12 and support member 14 through an intermediate bracket assembly 102. Each intermediate bracket assembly 102 includes a first member 104 and a second member 106. First member 104 includes a leg 108 having a first end 110 coupled to a respective coupling portion 30 of mounting plate 12 by a fastener 112. As shown in FIGS. 2–3, first end 110 of leg 108 includes a ridge 114 and a recess 116 for interlocking with complementing ridge 32 and recess 34 of coupling portion 30. Leg 108 includes a second end 122 having a connecting arm 124 offset at an angle with respect to leg 108. A coupling arm 126 is coupled to second end 122 of leg 108 and extends at an offset angle with respect to leg 108. Coupling arm 126 includes a first portion 128 extending at an angle with respect to leg 108. Coupling arm 126 also includes a second portion 130 extending from the first portion in a direction generally parallel to leg 108. Second portion 130 is dimensioned to be received in recess 98 of support bracket 16 and coupled thereto by a fastener 131.

Second member 106 of intermediate bracket assembly 102 includes a leg portion 132 having a first end 134 coupled to coupling portion 70 on support member 14 by a threaded fastener 136. First end 134 of leg 132 also includes a ridge 138 and recess 140 for interlocking with a complementary ridge 72 and recess 74 on coupling portion 70. Leg 132 has a second end 142 with a connecting arm 144. As shown in FIG. 2, connecting arm 144 extends at an acute angle to leg 132 and has a length for overlapping and coupling with connecting arm 124 of first member 104. Connecting arm 144 also includes a ridge 146 and recess 148 for interlocking with a complementing ridge and recess of connecting arm 124.

A coupling arm 150 extends from second end 142 of leg 132 and includes a first portion 152 and a second portion 154 extending at an offset angle with respect to first portion 152. Second portion 154 is dimensioned to complement recess 98 in offset portion 96 of support bracket 16 and is coupled thereto by a fastener 155.

The various components of mounting bracket 10 are generally made of metal, such as aluminum, having sufficient strength to support a number of electrical components. In preferred embodiments, each of the components is formed from extruded aluminum that is cut to length. Generally, mounting plate 12, support member 14 and brackets 16 are integrally formed members as shown. In alternative embodiments, the various components can be made of other metals or composite materials.

The mounting rack is assembled as shown in FIG. 1 by coupling mounting plate 12 and support member 14 together by the respective mounting arms 36 and 56. Preferably, support members 14 are coupled to mounting plate 12 at the top and bottom ends. Support brackets 16 are then coupled to mounting plate 12 and each of the support members 14 to provide a pair of supports for each electrical device.

Referring to FIG. 2, mounting rack 10 is attached to a support structure 156, which is generally a utility pole. Fasteners 158, such as bolts, extend through the key hole 26 and U-shaped notch 24 of mounting plate 12 to attach mounting rack 10 to support structure 156. An electrical device 160, such as a transformer, is attached to each support bracket 16. In preferred embodiments, a bolt 162 or other fastener extends through an aperture 164 in outer wall 90 for attaching electrical device 160 to support brackets 16.

Figure 5:
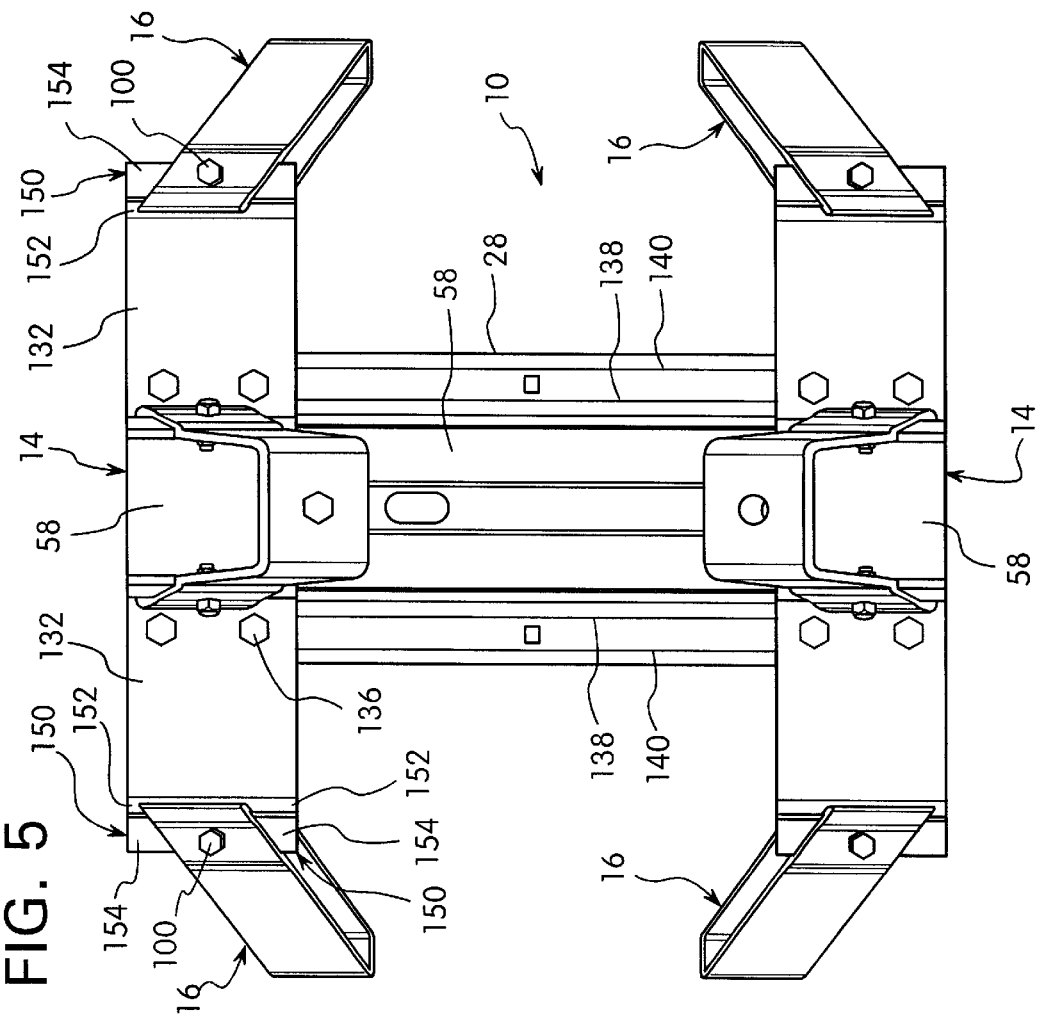
FIG. 5 is a front side view of the electrical equipment mounting device of the embodiment of FIG. 1.

Referring to FIGS. 1, 4 and 5, support brackets 16 are coupled to mounting plate 12 and support member 14 at an offset angle with respect to the longitudinal dimension of mounting rack 10. As shown in FIGS. 2 and 3, recess 98 of offset portion 96 of support bracket 16 is at an offset angle with respect to a longitudinal dimension of leg 92. This enables the leg portion 92 of support brackets 16 to be angled with respect to mounting plate 12 and support member 14. In the embodiment illustrated, support brackets 16 coupled to top end 18 of mounting plate 12 are angled downwardly toward bottom end 20. Support brackets 16 coupled to bottom end 20 of mounting plate 12 are angled to extend in a generally upward direction toward top end 18. In alternative embodiments, support brackets 16 can be inverted to extend away from the top end 18 and bottom end 20, respectively, of mounting plate 12 to accommodate electrical equipment with larger mounting hole spacing.

EMBODIMENT OF FIG. 6

Figure 6:
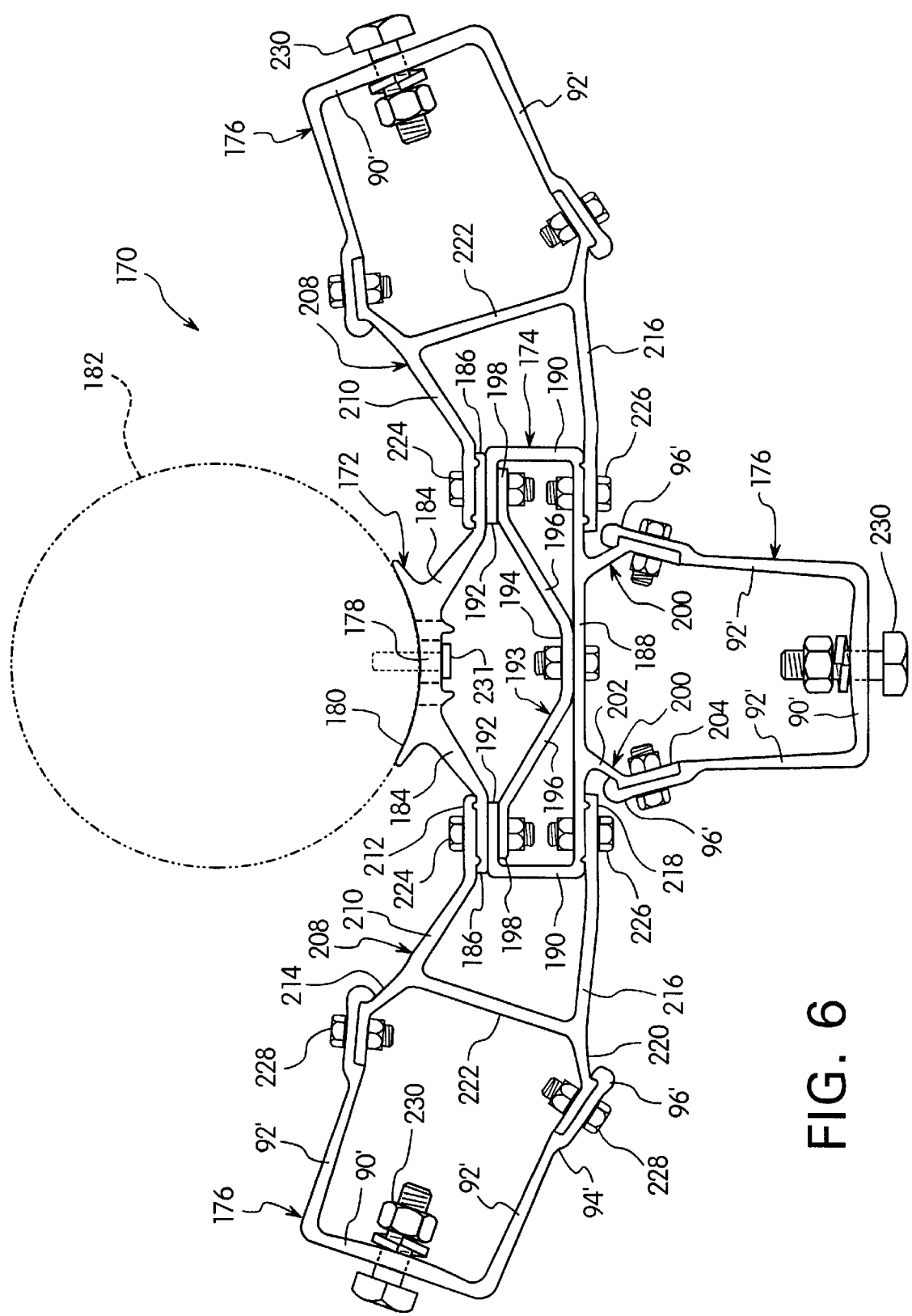
FIG. 6 is a top view of an electrical equipment mounting device in a second embodiment of the invention.

FIG. 6 shows a mounting rack 170 in a second embodiment of the invention and is similar to the embodiment of FIG. 1–5. Mounting rack 170 includes a mounting plate 172, a support member 174 and a plurality of support brackets 176. FIG. 6 is a top view of the mounting rack showing each of the components. As in the embodiment of FIGS. 1–5, the mounting rack includes a support member 174 attached to the top end and the bottom end of mounting plate 172 and a plurality of support brackets 176 coupled to each of the support members 174 and the mounting plate 172.

Mounting plate 172 includes a center portion 178 having a concave recessed area 180 for attaching to a utility pole 182. A pair of legs 184 extend outwardly from opposite sides of center portion 178 at an angle. A coupling tab 186 extends from the outer ends of each leg 184 to form a coupling surface. Each of the coupling tabs 186 as shown in FIG. 6 is arranged in the same plane that extends in a plane substantially parallel to center portion 178.

Support member 174 has a substantially planar body portion 188. A leg 190 is coupled to each end of body portion 188 and extends in a direction substantially perpendicular to body portion 188. A coupling tab 192 extends from the outer end of each leg 190 and extends inwardly substantially parallel to body portion 188. A brace 193 having a generally V-shaped configuration includes a base portion 194 and two diagonal arms 196 coupled to opposite ends of base portion 194. An outwardly extending coupling tab 198 is coupled to the outer end of each diagonal arm 196.

A pair of coupling arms 200 extend from body portion 188 for coupling with a support bracket 176. As in the previous embodiment, coupling arms 200 include a first portion 202 extending outwardly from body portion 188 at a first angle and a second portion 204 extending from an outer end of first portion 202 at a second angle.

Support brackets 176 are substantially the same as support brackets 16 so that each component is identified by the same reference number with the addition of a prime. As shown in FIG. 6, support brackets 176 are coupled to mounting plate 172 and support member 174 through an intermediate bracket assembly 208. Intermediate bracket assembly 208 is a unitary member having a first arm 210 with a first arm portion 212 at a first end and a second coupling arm 214 at a second end of first arm 210. A second arm 216 includes a first coupling arm 218 coupled to a first end of second arm 216 and extends in a direction generally parallel to first coupling portion 212. A second coupling arm 220 extends from a second end of second arm 216. A cross member 222 connects first arm 210 and second arm 216 together.

Mounting rack 170 is assembled as shown in FIG. 6 by connecting coupling tab 192 of support member 174 to tab 186 of mounting plate 172. Coupling arm 212 of each intermediate bracket 208 is also coupled to tab 186 of mounting plate 172. Each of the coupling tabs and arms include an aperture (not shown) for receiving a fastener 224, such as a threaded bolt and nut. As shown, tab 186 of mounting plate 172 and coupling arms 212 include a complementing ridge and recess for interlocking the components together as in the previous embodiment. Coupling arms 218 of intermediate bracket 208 are also coupled to body portion 188 of support member 174 by a fastener 226.

Support brackets 176 are attached to the respective coupling arm 214, 220 of intermediate bracket 208 by fasteners 228. An electrical component, such as a transformer, is attached to the outer wall 90' of each support bracket 176 by a suitable fastener 230. Mounting plate 172 is attached to a utility pole 182 by a suitable fastener 231 as in the previous embodiment.

EMBODIMENT OF FIG. 7

Figure 7:
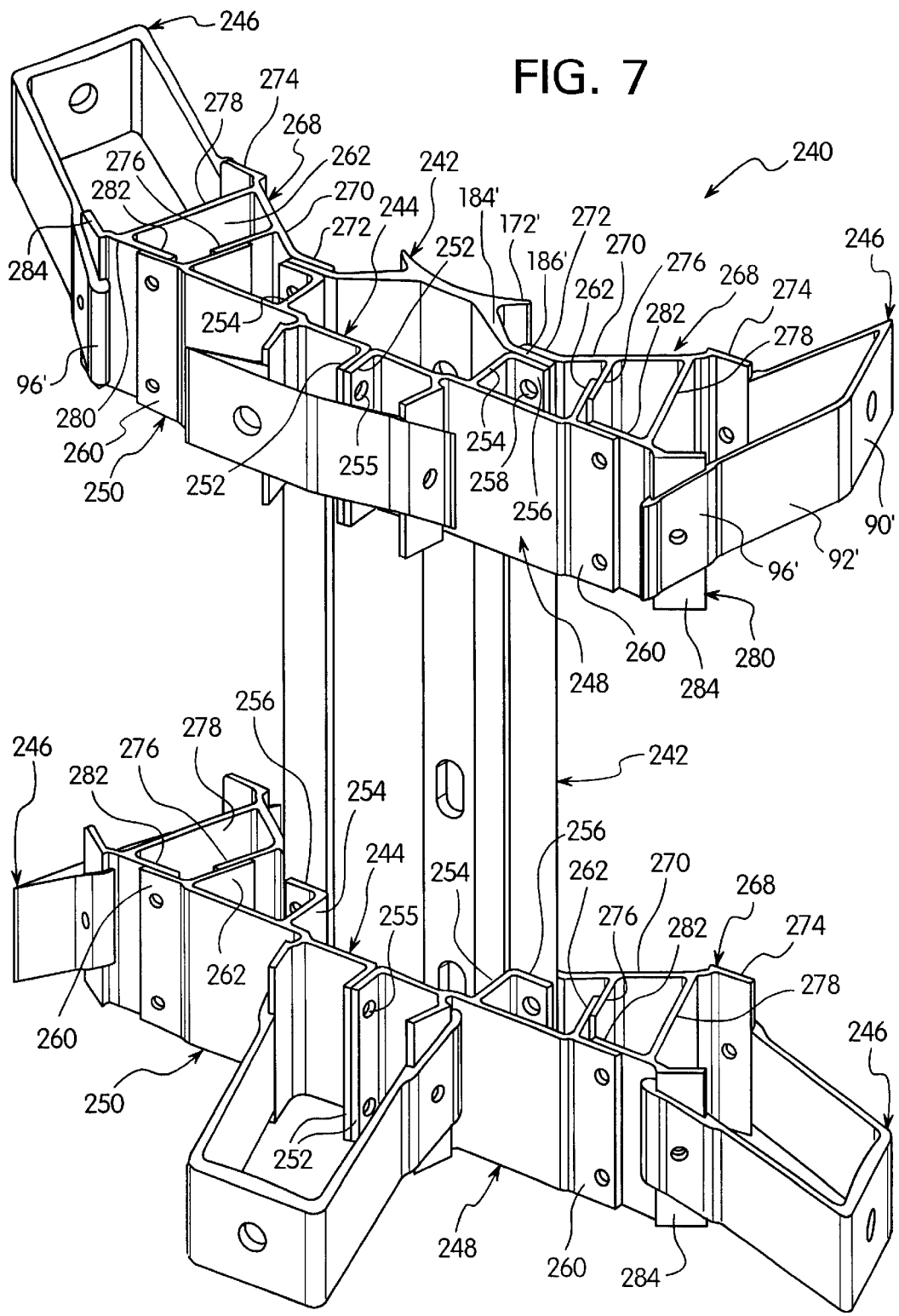
FIG. 7 is a perspective view of an electrical equipment mounting device in a third embodiment of the invention.

FIG. 7 illustrates a mounting rack 240 in a third embodiment of the invention. Mounting rack 240 includes a mounting plate 242, a support member 244 and a plurality of mounting brackets 246. Mounting plate 242 is substantially the same as mounting plate 172 of the embodiment of FIG. 6, so that identical components are identified by the same reference number with the addition of a prime.

Mounting brackets 246 are substantially identical to the mounting brackets in the embodiment of FIG. 1 so that identical components are identified by the same reference number with the addition of a prime.

Support member 244 includes a first section 248 and a second section 250 that are substantially mirror images of each other. Sections 248 and 250 each include a coupling tab 252 having an aperture 255 for receiving a fastener (not shown), such as a nut and bolt coupling the sections together and forming support member 244. Each section 248, 250 of support member 244 includes a leg 254 extending substantially perpendicular to the plane of support member 244 and terminating in an outwardly extending coupling tab 256. As shown, coupling tab 256 extends generally perpendicular to leg 254. Coupling tab 256 is provided with an aperture 258 complementing an aperture in mounting plate 242 for receiving a fastener and coupling the support member 244 to mounting plate 242.

An outer end of each section 248, 250 of support member 244 includes a coupling tab 260 and an inwardly extending tab 262. Coupling tabs 260 extend outwardly from support member 244 for supporting a respective mounting bracket 246.

Mounting brackets 246 are coupled to mounting plate 242 and support member 244 by an intermediate bracket 268. Intermediate bracket 268 includes a first leg 270 having a coupling tab 272 for joining with mounting plate 242. A second coupling tab 274 is provided at an end of first leg 270 opposite coupling tab 272 for coupling with a respective mounting bracket 246. A tab 276 extends from first leg 270 for joining with tab 262. A cross member 278 extends from first leg 270 to a second leg 280. Second leg 280 includes a tab 282 for coupling with coupling tab 260 of a respective section 248, 250 of support member 244. A coupling tab 284 extends from an end of leg 280 opposite tab 282 for coupling with a mounting bracket 246.

As in the previous embodiments, two support members 244 are coupled to top and bottom ends of mounting rack 240 and a plurality of mounting brackets 246 are coupled to each support member at top and bottom ends of mounting plate 242. In the embodiment illustrated, mounting brackets 246 are mounted to diverge away from each other. Alternatively, mounting brackets 246 can be inverted and mounted to converge toward each other. Each of the coupling tabs include apertures for receiving a fastener (not shown). As in the previous embodiments, electrical devices, such as a transformer, are mounted to mounting brackets 246 by a suitable fastener.

EMBODIMENT OF FIGS. 8–10

Figure 8:
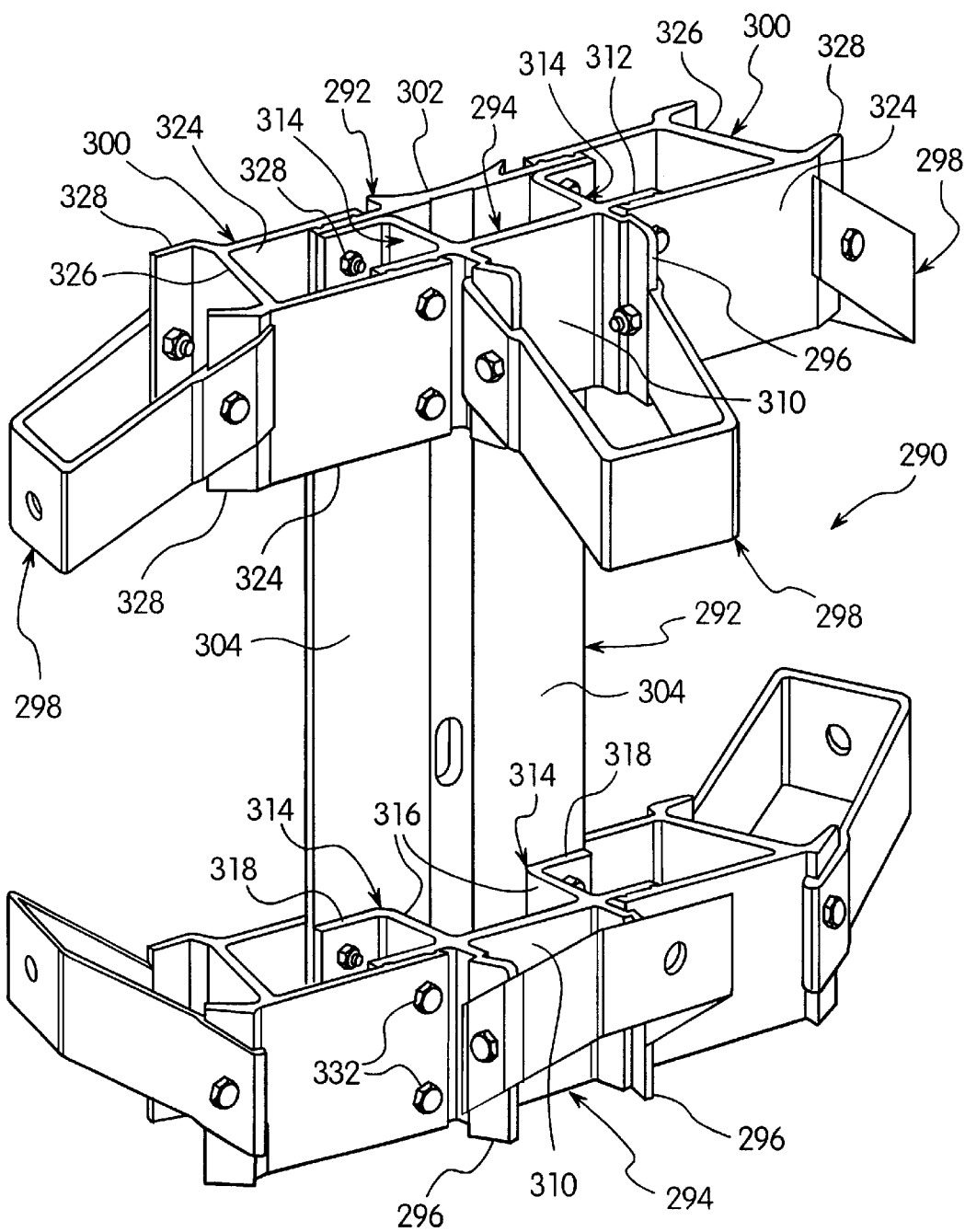
FIG. 8 is a perspective view of the mounting device in a fourth embodiment of the invention.
Figure 9:
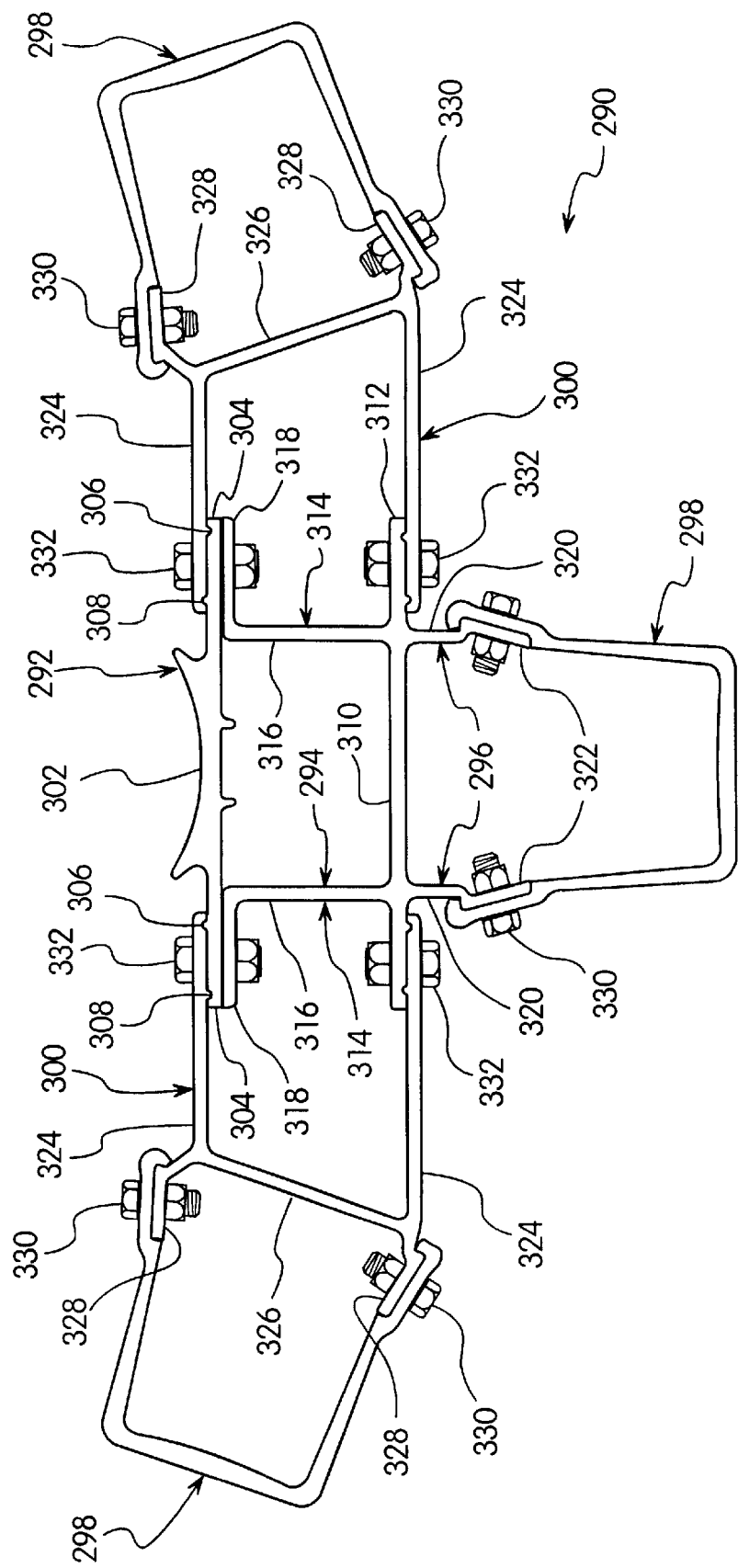
FIG. 9 is a top view of an electrical equipment mounting device in the embodiment of FIG. 8.
Figure 10:
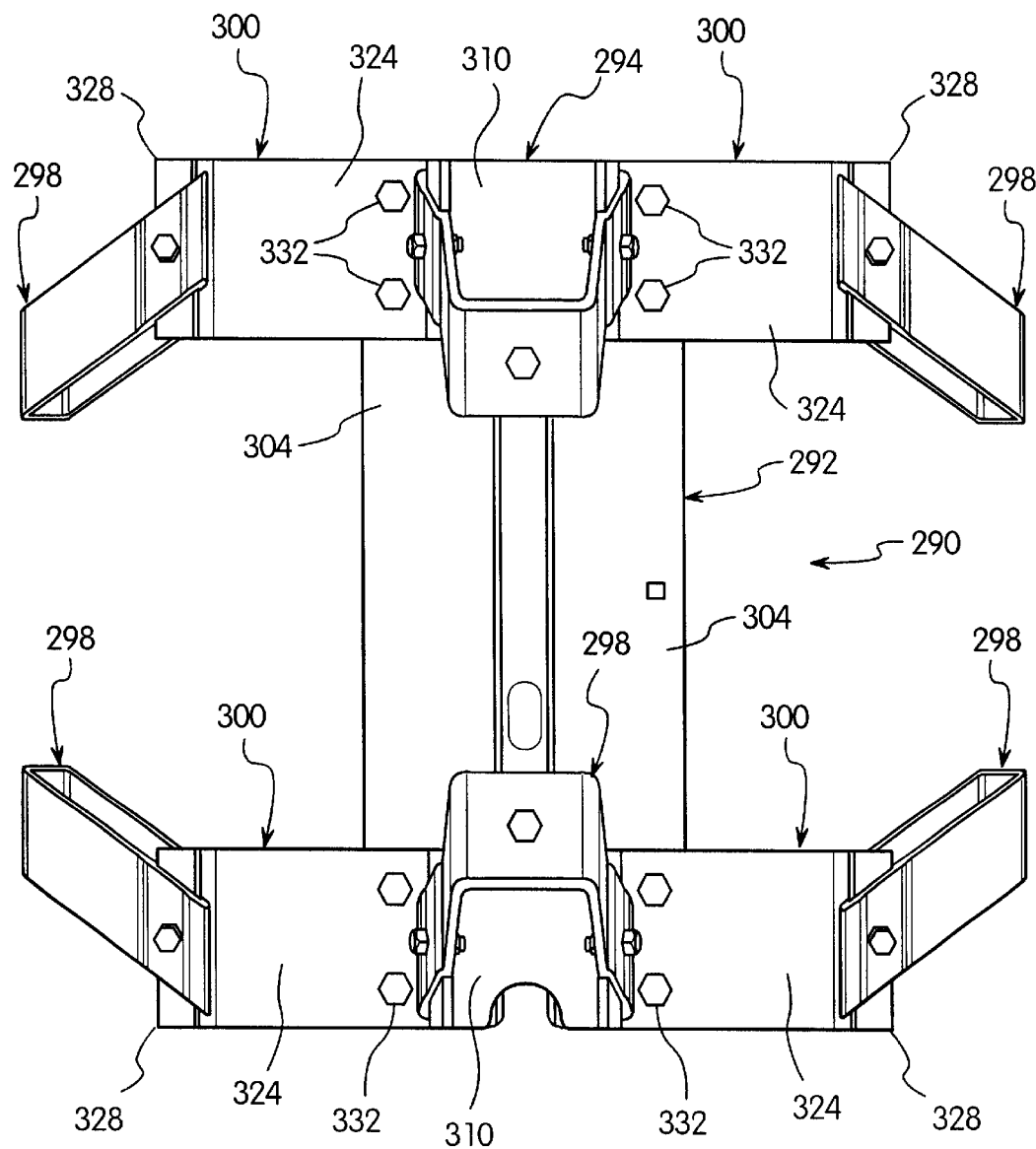
FIG. 10 is a front view of the mounting device in the embodiment of FIG. 8.

Referring to FIGS. 8–10, a further preferred embodiment of the invention is illustrated. The mounting rack 290 of FIGS. 8–10 is similar to mounting rack 10 of the embodiment of FIGS. 1–5 except for the mounting plate 292 and support member 294. Mounting rack 290 is similar to the previous embodiments in that a support member 294 is coupled to mounting plate at a top end and bottom end of mounting plate 292 as shown in FIGS. 8 and 10.

A mounting bracket 298 is coupled to support member 294 by coupling arms 296. A pair of mounting brackets 298 are coupled to support member 294 and mounting plate 292 by intermediate coupling members 300. Each mounting bracket 298 is identical to mounting brackets 16 of the embodiment of FIG. 1.

Mounting plate 292 has a generally planar configuration with a generally concave mounting face 302 and outwardly extending mounting arms 304. Each mounting arm 304 includes two holes at the top and bottom ends that are dimensioned to receive a fastener 328 for coupling with a respective intermediate coupling member 300. As in the previous embodiments, a ridge 306 and recess 308 are provided on each mounting arm 304 for coupling with a complementary ridge and recess on an intermediate coupling member 300.

Support member 294 is a unitary member having a substantially planar body 310 having outer ends forming mounting arms 312. A pair of generally L-shaped mounting arms 314 extend in a generally perpendicular direction to body 310. Mounting arms 314 of support member 294 have a first leg 316 extending substantially perpendicular to body 310 and a second leg 318 extending outwardly in a direction substantially parallel to body 310. Second leg 318 includes a pair of holes complementing holes in coupling arms 304 of mounting plate 292.

A pair of coupling arms 296 extend from body 310 of support member 294 in an opposite direction from mounting arms 314. As in the previous embodiments, coupling arms 296 include a first offset portion 320 and second portion 322 forming a coupling tab for coupling with a mounting bracket 298.

Intermediate coupling member 300 includes a pair of substantially parallel legs 324 extending from a cross member 326. As shown in FIG. 9, cross member 326 extends diagonally between legs 324. A coupling arm 328 extends outwardly from each end of cross member 326 for coupling with a mounting bracket 298.

Referring to FIGS. 8 and 9, mounting rack 290 is assembled by coupling support members 294 to the top and bottom ends of mounting plate 292 by a fastener 332 extending through the holes in mounting plate 292 and mounting arms 314. Intermediate coupling member 300 is also coupled to mounting plate 292 and support member 294 by fasteners 332 as shown in FIG. 9. Mounting brackets 298 are coupled to the respective coupling arms by fasteners 332. As shown in FIG. 8, mounting brackets 298 are angled to extend toward each other but can be reversed to extend away from each other.

What is claimed is:

1. A mounting device, for supporting electrical equipment on a utility pole, said device comprising:
    a mounting plate, for coupling to said utility pole, said mounting plate having a first side and a second side;
    a support member having a body portion with a top end, a bottom end, a first side and a second side and at least one mounting arm extending from said body portion, said at least one mounting arm being coupled to said mounting plate, for spacing said body portion from said mounting plate, said at least one mounting arm oriented in a plane extending between said top end and said bottom end of said body portion;
    a first support bracket coupled to said first side of said mounting plate and said first side of said support member for supporting electrical equipment; and
    a second support bracket coupled to said second side of said mounting plate and said second side of said support member for supporting said electrical equipment.

2. The mounting device of claim 1, wherein said support member includes a first mounting arm coupled to said mounting plate and said support member including a second mounting arm coupled to said mounting plate.

3. The mounting device of claim 2, wherein said first mounting arm and said second mounting arm of said support member extend in a generally perpendicular direction to said body portion of said support member.

4. The mounting bracket of claim 3, wherein each of said first and second mounting arms of said support member include a first leg having a first end coupled to said body portion and extending substantially perpendicular to said body portion of said support member, each said first leg having a second end and a second leg coupled thereto and extending substantially perpendicular to said first leg.

5. The mounting bracket of claim 4, wherein said second legs of said first and second mounting arms of said support brackets extend outwardly toward an outer edge of said support member.

6. The mounting bracket of claim 4, wherein said second legs of said first and second mounting arms of said support member extend inwardly with respect to an outer edge of said support member.

7. The mounting device of claim 2, wherein said mounting plate further comprises a first mounting arm and a second mounting arm extending in a generally perpendicular direction to a plane of said mounting plate, said first mounting arm of said mounting plate being coupled to said first mounting arm of said support member, and said second mounting arm of said mounting plate being coupled to said second arm of said support member.

8. The mounting device of claim 7, wherein said first mounting arm of said mounting plate and said first mounting arm of said support member each include an aperture, said device further comprising a fastener extending through said respective aperture for coupling said first arm of said mounting plate and said support member together.

9. The mounting device of claim 7, wherein said first and second mounting arms of said mounting plate and said first and second mounting arms of said support member include an interlocking complementary recess and ridge.

10. The mounting device of claim 7, wherein said first and second mounting arms of said mounting plate and said first and second mounting arms of said support member are substantially parallel to each other.

11. The mounting device of claim 1, wherein said first support bracket is mounted at an angle with respect to a plane of said mounting plate.

12. The mounting device of claim 1, wherein each of said first and second support brackets include a substantially U-shaped bracket member for coupling with said electrical equipment, and an intermediate bracket assembly for coupling said U-shaped bracket member to said mounting plate and said support member.

13. The mounting device of claim 1, further comprising a third support bracket coupled to said support member.

14. The mounting device of claim 13, wherein said support member includes a first coupling arm and a second coupling arm extending outwardly therefrom, said third support bracket being coupled to said first and second coupling arms of said support member.

15. The mounting device of claim 13, wherein said first and second coupling arms of said support member are angled with respect to said support member.

16. The mounting device of claim 1, wherein said mounting plate and said body portion of said support member are substantially parallel to each other.

17. The mounting device of claim 1, wherein said support member includes a first mounting arm extending from a first side of said support member, and a second mounting arm extending from said second side of said support member.

18. The mounting device of claim 17, wherein said first mounting arm of said support member is coupled to said first side of said mounting plate, and wherein said second mounting arm of said support member is coupled to said second side of said mounting plate.

19. The mounting device of claim 1, wherein said mounting plate is oriented in a first plane and said body portion of said support member is oriented in a second plane substantially parallel to said first plane, and wherein said at least one mounting arm is oriented in a third plane intersecting said first plane and said second plane, said third plane extending between said top end and bottom end of said body portion.

20. A mounting rack, for mounting electrical equipment on a utility pole, said mounting rack comprising:
    a mounting plate for coupling to said utility pole, said mounting plate having a first longitudinal side edge and a second longitudinal side edge;
    a support member coupled to said mounting plate, said support member having a body portion with a first side edge and a second side edge, and a first coupling arm and a second coupling arm coupled directly to said body portion and extending outwardly from said body portion;
    a first support bracket and a second support bracket coupled to said first and second side edges of said mounting plate, respectively, and said first and second side edges, respectively, of said support member; and a third support bracket coupled to said first and second outwardly extending coupling arms of said support member.

21. The mounting rack of claim 20, said support member further comprising a first mounting arm and a second mounting arm extending in a generally perpendicular direction to said body portion of said support member and being coupled to said mounting plate.

22. The mounting rack of claim 21, wherein each of said first and second mounting arms of said Support member have a first leg with a first end coupled to said body portion and extending substantially perpendicular to said body portion, said first leg having a second end and a second leg coupled thereto and extending in a direction substantially perpendicular to said first leg.

23. The mounting rack of claim 21, wherein said mounting plate includes a first mounting arm and a second mounting arm extending from a plane of said mounting plate, each of said first and second mounting arms of said mounting plate being coupled to a respective first and second mounting arm of said support member.

24. The mounting rack of claim 23, wherein said first mounting arm of said mounting plate and said first mounting arm of said support member each include an aperture and a fastener extending through said respective aperture for coupling said first arm of said support member to said first arm of said mounting plate.

25. The mounting rack of claim 23, wherein said first and second arms of said mounting plate and said first and second mounting arms of said support member include a complementing recess and ridge.

26. The mounting rack of claim 23, wherein said first and second mounting arms of said mounting plate and said first and second mounting arms of said support member are substantially parallel to each other.

27. The mounting rack of claim 20, wherein each of said first and second support brackets include a first and second intermediate bracket assembly, respectively, and a substantially first and second U-shaped bracket member coupled to said first and second intermediate assembly, respectively, each of said first and second intermediate bracket assemblies being coupled to said first side and said second side, respectively, of said mounting plate and said support member.

28. The mounting rack of claim 20, wherein said body portion of said support member has a top end and a bottom end, said body further comprising a first mounting arm oriented in a plane extending between said top end and said bottom end, and a second mounting arm oriented in a plane extending between said top end and said bottom end, said first mounting arm and said second mounting arm being coupled to said mounting plate.

29. The mounting rack of claim 28, wherein said first mounting arm of said body portion extends outwardly from said first side edge of said body portion and wherein said second mounting arm of said body portion extends from said second side edge of said body portion.

30. The mounting rack of claim 29, wherein said first mounting arm of said body is coupled to said first side edge of said mounting plate, and wherein said second mounting arm is coupled to said second side edge of said mounting plate.

31. The mounting rack of claim 20, wherein said first coupling arm and said second coupling arm are integrally formed with said body portion.

32. A mounting rack for mounting electrical equipment on a utility pole, said mounting rack comprising:

a mounting plate for coupling to said utility pole, said mounting plate having a top end, a bottom end, a first longitudinal side, and second longitudinal side, said mounting plate further having a first mounting arm and a second mounting arm spaced from said first and second longitudinal sides and extending outwardly from said mounting plate;

at least one support member coupled to said first mounting arm and said second mounting arm of said mounting plate, said support member having a body portion extending generally parallel to said mounting plate; and a plurality of support brackets coupled to said support member and said mounting plate for supporting said electrical equipment.

33. The mounting rack of claim 26, wherein said first and second mounting arms of said support member extend in a generally perpendicular direction to a plane of said mounting plate.

34. The mounting rack of claim 26, wherein said mounting arms of said mounting plate and said first and second mounting arms of said support member include a complementing recess and ridge for interlocking together.

35. The mounting rack of claim 26, wherein said first and second mounting arms of said support member extend in a generally perpendicular direction to said body portion.

36. The mounting rack of claim 25, wherein each of said first and second support brackets include a first and second intermediate bracket assembly, respectively, and a substantially U-shaped bracket member coupled to said intermediate assembly, each of said intermediate bracket assemblies being coupled to said first and second sides, respectively, of said mounting plate and said support member.

37. The mounting rack of claim 32, wherein said mounting plate is oriented in a first plane and wherein said first mounting arm extends outwardly from said first plane.

38. A mounting device, for supporting electrical equipment on a utility pole, said device comprising:

a mounting plate, for coupling to said utility pole, said mounting plate having a first longitudinal side and a second longitudinal side;

a support member having a body portion with a top end, a bottom end, a first side end and a second side end, a first mounting arm extending from said first side end of said body portion and being coupled to said mounting plate, and a second mounting arm extending from said second side end of said body and being coupled to said mounting plate for spacing said body portion from said mounting plate;

a first support bracket coupled to said first side of said mounting plate and said first side of said support member for supporting electrical equipment; and a second support bracket coupled to said second side of said mounting plate and said second side of said support member for supporting electrical equipment.

39. The mounting device of claim 38, wherein said first mounting arm is coupled to said first longitudinal side of said mounting plate and said second mounting arm is coupled to said second longitudinal side of said mounting plate.

* * * * *